United States Patent
Basso et al.

(10) Patent No.: US 7,376,809 B2
(45) Date of Patent: May 20, 2008

(54) SYSTEMS AND METHODS FOR MULTI-FRAME CONTROL BLOCKS

(75) Inventors: Claude Basso, Raleigh, NC (US); Jean Louis Calvignac, Raleigh, NC (US); Chih-jen Chang, Apex, NC (US); Fabrice Jean Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 11/076,218

(22) Filed: Mar. 9, 2005

(65) Prior Publication Data

US 2006/0206684 A1    Sep. 14, 2006

(51) Int. Cl.
*G06F 12/02* (2006.01)
(52) U.S. Cl. ...................... 711/208; 711/211
(58) Field of Classification Search ............... 711/202, 711/170, 208, 209, 221; 709/238; 370/394, 370/460; 395/325; 710/263, 264, 39, 40; 707/205, 263
See application file for complete search history.

(56) References Cited

U.S. PATENT DOCUMENTS

| | | | |
|---|---|---|---|
| 4,590,468 A * | 5/1986 | Stieglitz .................... 370/460 |
| 5,119,478 A | 6/1992 | Calvignac et al. |
| 5,185,862 A | 2/1993 | Casper et al. |
| 5,287,463 A * | 2/1994 | Frame et al. ............... 395/325 |
| 5,535,214 A | 7/1996 | Shiobara |
| 5,561,785 A * | 10/1996 | Blandy et al. .............. 711/170 |
| 5,623,603 A | 4/1997 | Jiang et al. |
| 5,860,119 A | 1/1999 | Dockser |
| 6,434,145 B1 * | 8/2002 | Opsasnick et al. .......... 370/394 |
| 6,434,620 B1 | 8/2002 | Boucher et al. |
| 6,460,120 B1 | 10/2002 | Bass et al. |
| 6,760,776 B1 * | 7/2004 | Gallo et al. ................. 709/238 |
| 7,107,265 B1 * | 9/2006 | Calvignac et al. .............. 707/6 |
| 2002/0118690 A1 | 8/2002 | Calvignac et al. |
| 2002/0120890 A1 | 8/2002 | Calvignac et al. |
| 2002/0156908 A1 * | 10/2002 | Basso et al. ................. 709/231 |

OTHER PUBLICATIONS

"IBM PowerNP network processor: Hardware, software, and applications"; J. R. Allen, Jr., et al.; Mar. 2003.*
Masanori Uga & Kohei Shiomoto—"A Fast and Compact Longest Match Prefix Look-up Method Using Pointer Cache for Very Long Network Address" IEEE, CCN, Oct. 11-13, 1999, pp. 595-602.*

* cited by examiner

*Primary Examiner*—Pierre-Michel Bataille
(74) *Attorney, Agent, or Firm*—Joscelyn G. Cockburn; Schubert Osterrieder & Nickelson PLLC

(57) ABSTRACT

Systems and methods for implementing multi-frame control blocks in a network processor are disclosed. Embodiments include systems and methods to reduce long latency memory access to less expensive memory such as DRAM. As a network processor in a network receives packets of data, the network processor forms a frame control block for each packet. The frame control block contains a pointer to a memory location where the packet data is stored, and is thereby associated with the packet. The network processor associates a plurality of frame control blocks together in a table control block that is stored in a control store. Each table control block comprises a pointer to a memory location of a next table control block in a chain of table control blocks. Because frame control blocks are stored and accessed in table control blocks, less frequent memory accesses may be needed to keep up with the frame rate of packet transmission.

7 Claims, 4 Drawing Sheets

SYSTEMS AND METHODS FOR MULTI-FRAME CONTROL BLOCKS

FIELD

The present invention is in the field of digital processing. More particularly, the invention is in the field of organizing frame control blocks to reduce long latency memory accesses with cost effective memory.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

In today's networked world, bandwidth is a critical resource. Very high network traffic, driven by the Internet and other emerging applications, is straining the capacity of network infrastructures. To keep pace, organizations are looking for better ways to support and manage traffic growth and the convergence of voice with data. Today's dramatic increase in network traffic can be attributed to the popularity of the Internet, a growing need for remote access to information, and emerging applications. The Internet alone, with its explosive growth in e-commerce, has placed a sometimes insupportable load on network backbones. The growing demands of remote access applications, including e-mail, database access, and file transfer, are further straining networks.

Eliminating network bottlenecks continues to be a top priority for service providers. Routers are often the source of these bottlenecks. However, network congestion in general is often misdiagnosed as a bandwidth problem and is addressed by seeking higher-bandwidth solutions. Today, manufacturers are recognizing this difficulty. They are turning to network processor technologies to manage bandwidth resources more efficiently and to provide the advanced data services, at wire speed, that are commonly found in routers and network application servers. These services include load balancing, QoS, gateways, fire walls, security, and web caching.

A Network Processor (NP) may be defined as a programmable communications integrated circuit capable of performing one or more of the following functions:

Packet classification—identifying a packet based on known characteristics, such as address or protocol Packet modification—modifying the packet to comply with IP, ATM, or other protocols (for example, updating the time-to-live field in the header for IP)

Queue/policy management—reflects the design strategy for packet queuing, de-queuing, and scheduling of packets for specific applications Packet forwarding—transmission and receipt of data over the switch fabric and forwarding or routing the packet to the appropriate address Although this definition accurately describes the basic features of early NPs, the full potential capabilities and benefits of NPs are yet to be realized. Network processors can increase bandwidth and solve latency problems in a broad range of applications by allowing networking tasks previously handled in software to be executed in hardware. In addition, NPs can provide speed improvements through certain architectures, such as parallel distributed processing and pipeline processing designs. These capabilities can enable efficient search engines, increase throughput, and provide rapid execution of complex tasks.

Network processors are expected to become the fundamental network building block for networks in the same fashion that CPUs are for PCs. Typical capabilities offered by an NP are real-time processing, security, store and forward, switch fabric, and IP packet handling and learning capabilities. The processor-model NP incorporates multiple general purpose processors and specialized logic. Suppliers are turning to this design to provide scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new ASIC designs.

A network processor comprises a data flow unit to handle the movement of data at a network node. To keep pace with the speed of packet transmission, the network processor must implement data buffering at a 40 ns frame recurrence rate for a SONET link operating at 9.95328 Giga-bits-per-second (Gbps). Buffering of large quantities of data calls for a large data store that is implemented in DRAM (Dynamic Random Access Memory.) A large data store calls for a large control store to maintain information about each packet of data handled by the data flow unit. This information includes, packet size, location in the data store, etc. The information for a packet is organized into a Frame Control Block (FCB) and the frame control blocks are stored in the control store. Because DRAM is inexpensive relative to the cost of higher speed memory such as SRAM (Static RAM), implementation of the control store in DRAM is desirable. Also, implementation of the control store in the same type of memory that implements the data store allows scalability of buffering, since the control store size is generally proportional to data store size.

However, the relatively long memory access time for DRAM interferes with the performance of some network processing functions. When a packet is received its FCB is placed in a queue corresponding to the flow of packets to which it belongs. Thus, there is a queue of FCBs corresponding to a queue of packets. The FCBs are stored in a linked list format. Each FCB has the pointer to the next FCB in the list, thereby forming a chain. When a packet is to be transmitted, the data flow unit reads the FCB of the packet from the control store and gets the address of the next FCB in the chain. For a control store implemented in DRAM, this typically takes longer than the 40 ns packet rate. Thus, there is a need for systems and methods to reduce long latency accesses to a control store implemented in DRAM or similar cost effective memory.

SUMMARY

The problems identified above are in large part addressed by systems and methods to reduce long latency accesses to a control store implemented in DRAM or similar cost effective memory. Embodiments implement a method for organizing frame control blocks in memory to enable less frequent reading and writing of a memory. In one embodiment, a data flow unit in a network processor comprises a pre-enqueue memory for storing a plurality of frame control blocks to be associated into a group of frame control blocks to be written to a control store. Each frame control block is associated with a different packet of data received by the data flow unit and comprises a pointer to a memory location where the data of the packet is stored in a data store. The embodiment further comprises a post-dequeue memory for storing a plurality of associated frame control blocks received from the control store. A memory arbiter receives write instructions to copy a group of associated frame control blocks from the pre-enqueueing area to the control store. The memory arbiter also receives read instructions to copy a group of associated frame control blocks from the control store to the post-dequeueing area.

In one embodiment, a network processor for processing packets of data, comprises a data store to store packets of data received by the network processor and a control store to store table control blocks. Each table control block comprises a plurality of frame control blocks. Each frame control block is associated with a different packet of data received by the network processor. The embodiment further comprises a receiver controller to receive packets of data, and to form table control blocks to be stored in the control store. An embedded processors complex comprising a plurality of processors processes packet data received by the receiver controller. The embodiment also comprises a transmitter controller to obtain table control blocks from the control store and to transmit packets of data associated with the frame control blocks in each table control block.

Another embodiment provides a method for storing and retrieving frame control blocks associated with packet data received by a network processor. The method comprises associating a plurality of frames of packet data to form a table control block. The table control block comprises a plurality of frame control blocks. Each frame control block is associated with a different packet of data received by the network processor and comprises a pointer to a memory location where a packet of data is stored. The method further comprises storing table control blocks in a control store. Each table control block comprises a pointer to a memory location where a next table control block in a sequence of table control blocks is stored. The method comprises retrieving a table control block from memory to process packets of data associated with the frame control blocks of the retrieved table control block.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods to reduce long latency memory access to less expensive memory such as DRAM. As a network processor in a network receives packets of data, the network processor forms a frame control block for each packet. The frame control block contains a pointer to a memory location where the packet data is stored, and is thereby associated with the packet. The network processor associates a plurality of frame control blocks together in a table control block that is stored in a control store. Each table control block comprises a pointer to a memory location of a next table control block in a chain of table control blocks. Because frame control blocks are stored and accessed in table control blocks, less frequent memory accesses may be needed to keep up with the frame rate of packet transmission.

Figure 1:
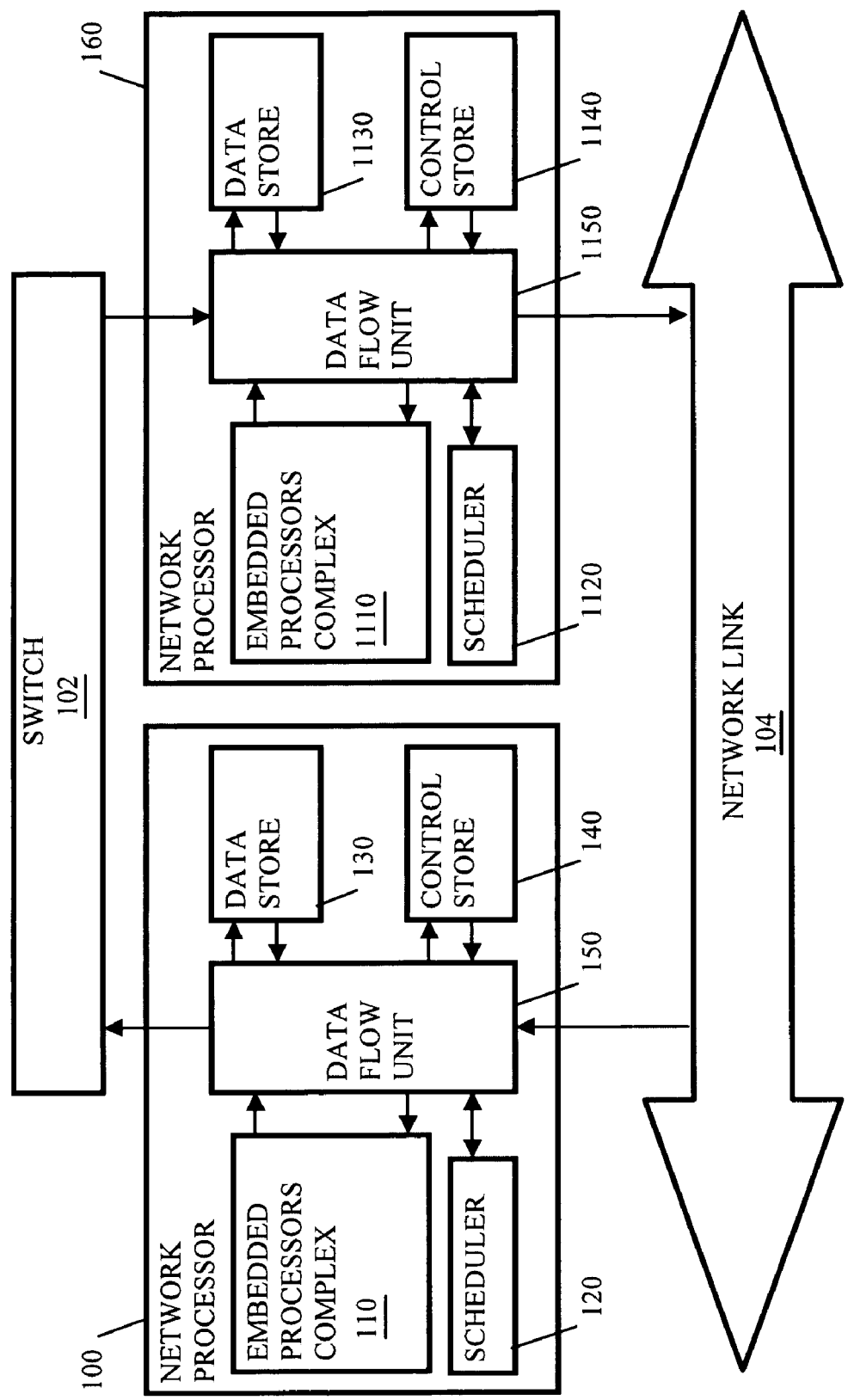
FIG. 1 depicts a plurality of network processors serving a network; each network processor comprising a data flow unit, and embedded processors complex, a scheduler, and control and data stores.

FIG. 1 shows an embodiment of a plurality of network processors 100 and 160 in a network. A network bus or full duplex network link 104 connected to computers, servers, other network processors, and other equipment in the network provides a stream of packets of data to a data flow unit 150 of network processor 100. Network processor 100 operates in an ingress mode to receive packets from network link 104 and transfer processed packets to a switch 102. Conversely, network processor 160 operates in an egress mode to receive packets from switch 102 and transfer processed packets to network link 104. Thus, a plurality of network processors may provide packets from the link to the switch (ingress) and a plurality of network processors may transfer packets from the switch to the link (egress). An overall purpose of the processors is to route information from a plurality of origination points in the network to a plurality of respective destination points in the network.

Data flow unit 150 receives packets of data from network link 104, and for each packet, forms a frame control block (FCB). Data flow unit 150 also writes each packet to a data store 130 implemented in DRAM. An FCB for a packet contains information about the packet. This information includes the size of the packet and where the packet is stored in data store 130. The FCB also contains a pointer to the next FCB in a chain of FCBs corresponding to one of a plurality of flow queues to which the packet belongs. Each FCB is stored in a control store 140 implemented in DRAM. Thus, the pointer to the next FCB points to an address of control store 140 where a next FCB in a chain is stored. The FCB provides a mechanism to keep track of a packet within the network processor and preserve an order in which it is received relative to other packets.

Each FCB is enqueued into one of a plurality of queues processed by an Embedded Processor Complex (EPC) 110. EPC 110 reads the frame pointer from the FCB and issues a read request to obtain frame data from the location in data store 130 pointed to by the frame pointer. The header of the frame is processed in one of a plurality of pico-processors in EPC 110. Multiple pico-processors enable simultaneous processing of multiple flow queues. The pico-processors of EPC 110 perform network processing functions including filtering, classification and forwarding. During frame processing, EPC 110 can issue requests to a memory arbiter in data flow unit 150 to read and write parts of the frame from and to data store 130. Once EPC 110 processes the frame data, the processed frame data may be temporarily stored in data store 130.

When frame processing is completed, EPC 110 passes the FCB to data flow unit 150. Data flow unit 150 enqueues the FCB into one of a plurality of flow queues of scheduler 120. Scheduler 120 selects the frame from a queue for transmission by passing the frame pointer of the FCB to the data flow unit. The frame pointed to by the frame pointer is read from data store 130 by data flow unit 150. The frame of packet data may be modified by data flow unit 150, and then transmitted out of the network processor. Thus, scheduler 120 is configured to schedule frames of data to be transmitted from network processor 100 to switch 102.

Similarly, network processor 160 provides an egress from the switch to the network. FIG. 1 shows elements of processor 160 corresponding to like-named, similarly-numbered elements of network processor 100. The description of the elements of network processor 100 applies to the like-named, similarly-numbered elements of network processor 160. Thus, network processor 160 comprises an EPC 1110, a scheduler 1120, a data store 1130, a control store 1140, and a data flow unit 1150. The data flow unit of network processor 160 receives packets from switch 102 and forms FCBs for the received packets as they are received. The packet data is stored in the data store and the FCBs are stored in the control store. The EPC processes the packets, and the scheduler schedules the processed packets for transmission to network link 104.

Figure 1A:
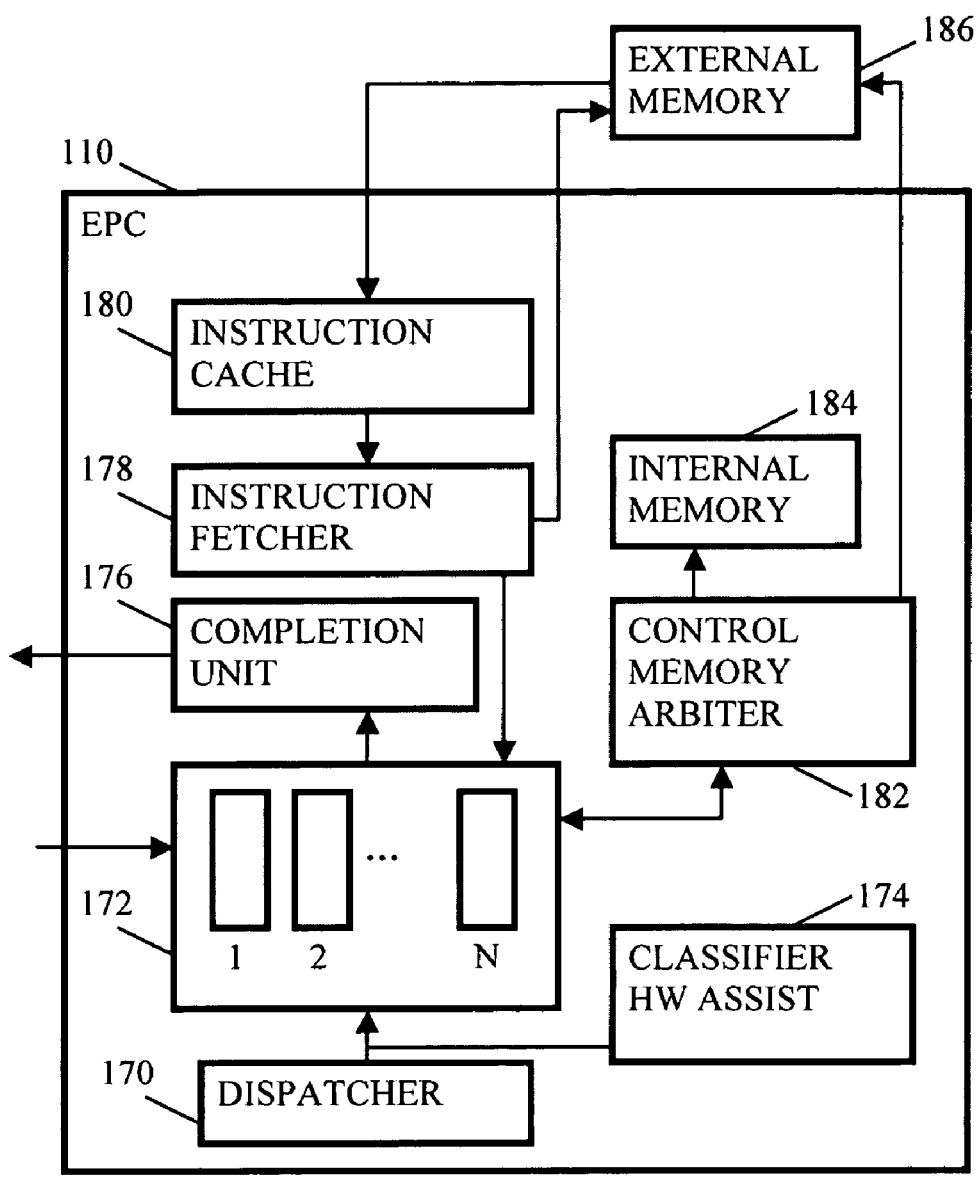
FIG. 1A depicts an embodiment of an embedded processor complex, with a plurality of processors operating in parallel to process packet data.

FIG. 1A shows a simplified block diagram of an Embedded Processors Complex EPC 110. Frames are received from a data store into EPC 110 and temporarily stored before being dispatached to an idle one of a plurality of parallel processors 172 by a dispatcher 170. When dispatcher 170 recognizes that a frame has been received by EPC 110, it finds one of the processors 172 that is available to receive frame data for processing. Processors 172 operate on different frames in parallel and dispatcher 170 attempts to keep as many processors busy processing frames as possible. Moreover, each processor of processors 172 is pipelined to enhance performance. For example, each processor may include a 3-stage pipeline (fetch, decode and execute). Processors 172 further comprise general purpose registers, special purpose registers, a dedicated arithmetic logic unit (ALU) and coprocessors. Further, a processor may comprise a primary data buffer, a scratch pad data buffer and control registers for data store operations.

Concurrently with dispatching a frame to one of processors 172, a classifier hardware assist 174 identifies the type of message format and identifies key information about the packet such as starting address, and header location. Processors 172 receive instructions from an on-chip instruction cache 180. Instruction cache 180 receives instructions from a memory 186 external to EPC 110 such as a system memory implemented in Random Access Memory (RAM). Ideally, instructions that are executed over and over again—i.e., steady state code—are kept in the instruction cache, to minimize long latency external memory reads.

Thus, EPC 110 may comprise an instruction fetcher 178 to initiate a transfer of instructions from external memory 186 to I-cache 180. The place in the cache to where an instruction is transferred from external memory 186 is determined by an index determined from the external memory address of the instruction. The index is the address of a cache entry. With each instruction stored in the cache, a tag determined from the external memory address is also stored. The tag identifies the instruction stored at the cache entry. In an n-way associative cache, there are n locations to store an instruction within a cache entry. To determine which one of the n-locations stores the instruction called for by the program counter of the instruction fetcher, a tag comparator within the instruction fetcher compares the tag from the program counter to the tag of each instruction at the cache entry until the correct instruction is found.

Each frame received by EPC 110 has identifying information such as a message number, a source address, and a destination address. The location and content of this information in a header of the frame data depends on the packet format. A processor must determine the identifying information in the frame, and determine the routing requirements of the packet. The frame header information allows the network processor to properly route the frame with other processed frames so that a completed message is received at an intended destination. Frames that have common identifying information form a "flow" and processors 172 simultaneously process a plurality of flows.

Processors 172 can also filter packets and enforce hundreds or more frame filter rules with complex range and action specifications. For example, filter rules can deny or permit a frame or allocate quality of service (QoS) based on IP header information. Filtering is essential for network security, and hardware assist 174 provides wirespeed enforcement of these complex rule sets.

Processors 172 send processed packets to a completion unit 176. While maintaining frame sequence, completion unit 176 passes processed frames to data flow unit 150. EPC 110 further comprises a control memory arbiter 182 to arbitrate requests for control memory by processors 172. Control memory may comprise internal memory 184 and external memory 186. Control memory stores tables, counters, and other data used by processors 172.

Figure 2:
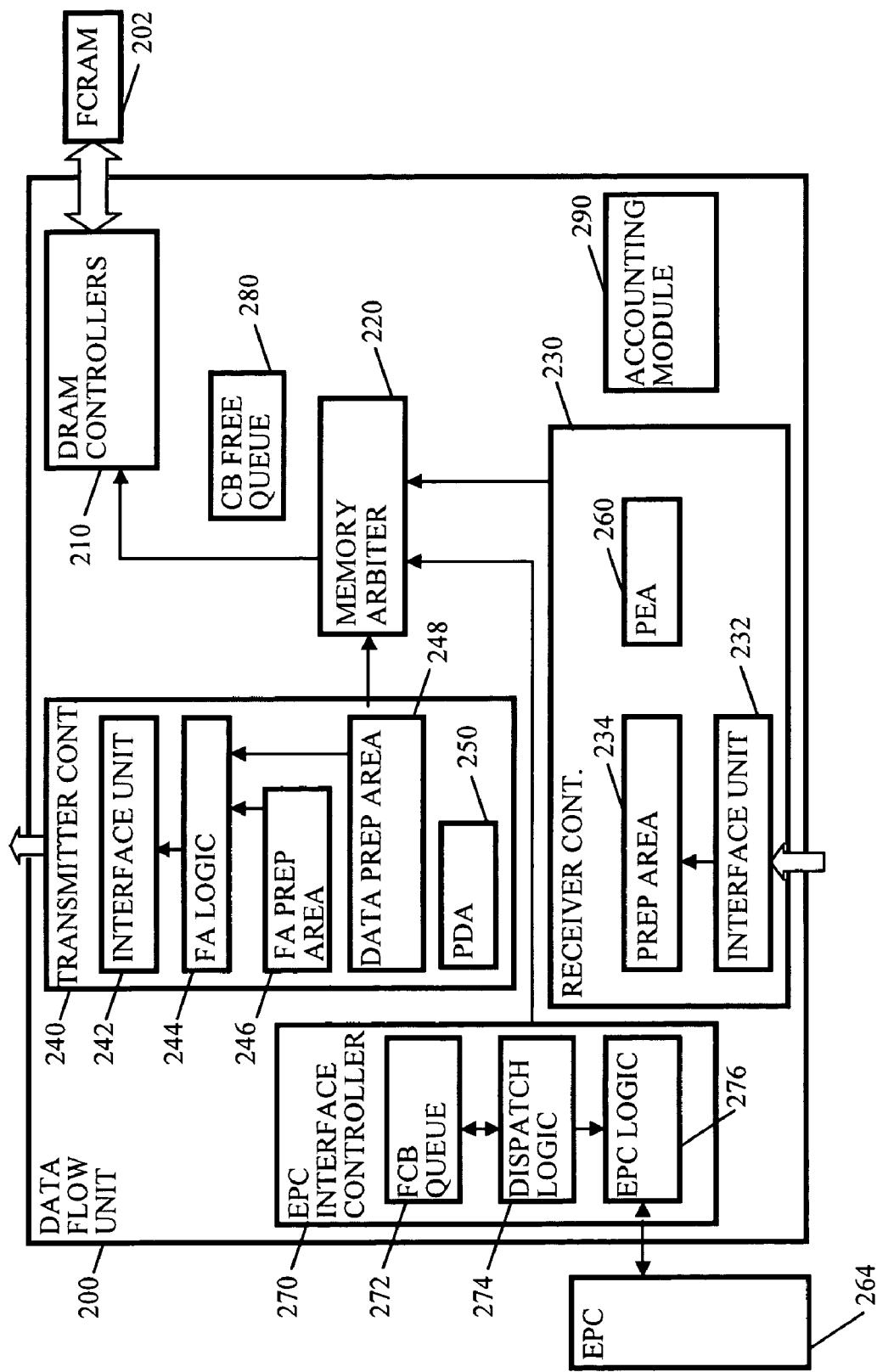
FIG. 2 depicts an embodiment of a data flow unit comprising a receiver controller, a transmitter controller, and an EPC interface controller.

FIG. 2 shows a block diagram of an embodiment of a data flow unit 200 and memory system 202. Memory system 202 is implemented in a type of DRAM called Fast Cycle RAM (FCRAM). The FCRAM forming memory system 202 can be divided into a data store for storing frame data and a control store for storing FCBs. Moreover, memory system 202 can be organized into slices. Each slice comprises a plurality of buffers to store frames of packet data in the data store or FCBs in the control store. DRAM controllers 210 control the reading of data from the FCRAM 202 and the writing of data to FCRAM 202. In one embodiment, DRAM controllers 210 control the transfer of 16 bytes per read or write request.

A memory arbiter 220 interfaces the data flow chip to memory system 202. Memory arbiter 220 receives write requests from a receiver controller 230 to write packet data to a data store of memory system 202 and to write FCBs to a control store of memory system 202. Memory arbiter 220 receives read requests from a transmitter controller 240 to read FCBs from the control store and to read packet data from the data store. Memory arbiter 220 also receives read and write requests from an EPC interface controller 270. EPC Interface controller 270 controls transfers of FCBs and packet data from memory system 202 to an embedded processors complex, EPC 264. EPC interface controller 270 also controls transfer of FCBs from EPC 264 to transmitter controller 240 and controls transfers of processed packet data to system memory 202.

Memory arbiter 220 receives the read and write requests from EPC interface controller 270, receiver controller 230, and transmitter controller 240, and schedules access to memory system 202. Frame data is written to different buffers distributed over different memory slices to make good use of memory bandwidth. In one embodiment, data is read from the FCRAM in 16-byte increments, with each buffer in a slice having 16 bytes. Similarly, data is written in 16 byte increments.

Receiver controller 230 receives and temporarily stores data from a link or switch. In an ingress mode, receiver controller 230 receives packet data from a network link. In an egress mode, receiver controller 230 receives packet data from a switch. Receiver controller 230 receives packets through an interface unit 232. Interface unit 232 is adaptable to receive packet data from a switch or a link. When a packet is received from interface unit 232, it is first stored in a preparation area 234, while a frame control block is obtained for the packet. As packets are received, receiver controller 230 issues write requests to memory arbiter 220 to write received packet data into individual buffers of a data store segment of memory system 202. Receiver controller 230 also issues write requests to write FCBs to the control store.

Receiver controller 230 temporarily stores packets received from interface unit 232 in a preparation area memory 234 prior to storing the packet data in a data store of memory system 202. While data is temporarily stored in preparation area 234, receiver controller 230 may dequeue FCBs from a Control Block (CB) free queue 280. CB free queue 280 may store a convenient number of FCBs not associated with any packet and provides a store of available FCBs to associate with packets as they are received. CB free queue 280 may be organized into frame control blocks and groups of frame control blocks may be organized into a Table Control Block (TCB). Each available FCB obtained from CB free queue 280 has a pointer to the address of the next free FCB in the free queue. When a packet is transmitted, its FCB is returned to CB free queue 280.

Each FCB includes a frame pointer that points to a memory location in the data store where the frame of packet data corresponding to the FCB is stored. Upon obtaining the FCB, receiver controller 230 issues a write request and transfers the packet to memory system 202 at the location determined by the frame pointer of the FCB. A copy of the FCB is stored in a control store of memory system 202. Each FCB in the control store contains a pointer to the control store location that contains the next FCB in the queue to form a chain of linked frame control blocks.

EPC Interface controller 270 comprises dispatch logic 274 to de-queue FCBs from a local FCB queue 272 which receives FCBs from the control store in memory system 202. Once dispatcher logic unit 274 dequeues the next FCB from FCB queue 272, dispatcher logic unit 274 issues a read request to memory arbiter 220 to obtain the frame header data of the packet. Thus, EPC 264 reads the frame pointer in the FCB and retrieves the frame header from the data store of memory system 202 at the location pointed to by the frame pointer. EPC 264 processes the frame header and issues a write request to memory arbiter 220 to write the processed frame data to the data store in memory system 202. Once EPC 264 processes the frame data, an EPC logic unit 276 issues the FCB associated with the processed frame to scheduler 120 or 1120.

Transmitter controller 240 comprises a data preparation area 248, a frame alteration command preparation area 246, frame alteration (FA) logic 244, and an interface unit 242. Data preparation area 248 comprises a relatively small amount of memory to store frame data prior to transmission to a switch or data link port by way of interface unit 242. Frame alteration command preparation area 246 receives commands from EPC 264 to effect modification of a frame. Frame alteration logic 244 receives a frame of data from data preparation area 248 and applies it to logic circuitry operating under the control of commands from FA preparation area 246. Thus, data flow unit 250 de-queues an FCB and reads the frame pointer. Data preparation area memory 248 receives the data from the data store location of memory system 202 that is pointed to by the dequeued FCB. Frame modification commands from EPC 264 are received by FA preparation area 246. These commands control FA logic 244 to alter the frame data before it is passed to interface unit 242.

Data Flow unit 200 further comprises an accounting module 290 to perform basic accounting functions. For example accounting 290 may count packets received, processed and transmitted in each of a plurality of flow queues. Each time accounting module 290 performs a count of a packet, an appropriate counter value must be read from a memory, incremented, and written back to the memory. Since there may be a very large number, perhaps, over a million, flow queues, accounting module 290 must implement a very large number of counters. Consequently, a very large number of counter values must be stored in a memory. For this reason, memory storage of these counter values in DRAM is desirable.

Thus, to process packets, frame control blocks are read from and written to a control store of memory system 202. However, the relatively long memory access time for DRAM or other cost effective memory could interfere with performance because the read latency of the memory is longer than the duration of a packet, which can be as short as 40 ns. Thus, embodiments overcome the read latency of a control store implemented in DRAM or other cost effective memory by forming Table Control Blocks (TCBs). Each TCB comprises four FCBs and a pointer to a next TCB in the chain. Shown in Table 1 is the organization of a TCB.

TABLE 1

| FCB 1 | NTA1 |
| FCB 2 | NTA2 |
| FCB 3 | NTA3 |
| FCB 4 | NTA4 |

Each row contains an FCB and a component, NTAn, of a pointer to a next TCB in a chain of TCBs. The components NTAn are concatenated to obtain the address of the next TCB. The TCB groups together FCBs from the same functional flow queue. Since a TCB contains 4 FCBs, a TCB must be accessed less often by a factor of 4. This overcomes the read latency of the DRAM control store. Clearly, a number of FCBs other than four could be grouped together in a single TCB. Table 2 shows six TCBs organized into a TCB page.

TABLE 2

| TCB 1 | TCB 2 | TCB 3 | NPA1 |
| TCB 4 | TCB 5 | TCB 6 | NPA2 |

Each row of the page comprises 3 TCBs and an address component NPAn. The address components are concatenated to obtain the address of the next page in a chain of TCB pages. Each row of a TCB page is 8 bytes for a total of 16 bytes in two rows. When memory arbiter 220 receives a read request, it directs DRAM controllers 210 to transfer 16 bytes from memory system 202. By organizing the TCBs into 16-byte pages, data flow unit 200 makes optimal use of memory bandwidth.

The same type of structure as shown in Tables 1 and 2 is used to form a TCB free queue 280. TCB free queue 280 provides a queue of available TCBs, each available TCB providing four available FCBs. An available TCB is dequeued from the TCB free queue by reading the TCB from a memory area that stores the TCB free queue. The TCB is associated with four packets. That is, each one of four FCBs in the TCB is associated with an individual packet. The TCB for the four packets along with the address of a next available TCB is enqueued into a control store of memory system 202 to link the TCB to the TCB queue.

To form a TCB, receiver controller 230 must receive 4 packets and form four FCBs. Therefore, a pre-enqueue area (PEA) 260 provides storage for up to three FCBs. When receiver controller 230 forms the fourth FCB, the fourth FCB is joined together in a TCB with the three FCBs stored in PEA 260. Similarly, a post-dequeue area (PDA) 250 provides storage for up to three FCBs waiting to be forwarded for processing after they have been received from a de-chained TCB. When a functional queue has less than 4 FCBs, the pre-enqueue area 260 operates as a shallow queue, with a head pointer, tail pointer, and FCB count.

Figure 3A:
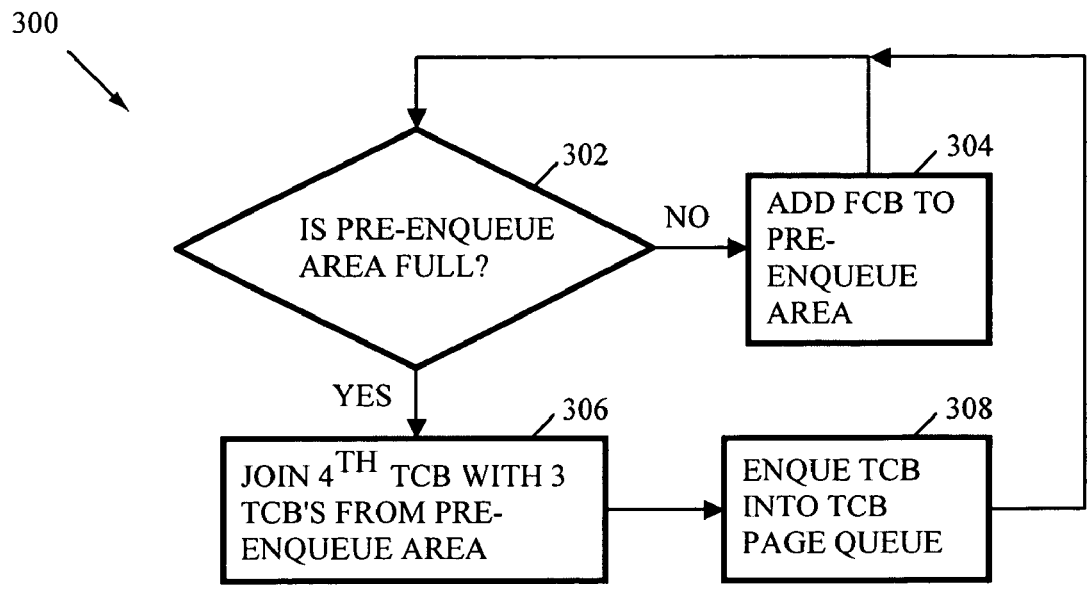
FIG. 3A depicts a flow chart for forming Table Control Blocks.

FIG. 3A shows a flow chart 300 of an embodiment to prepare a TCB using PEA 260. A determination is made whether the pre-enqueue area is full of FCBs (element 302). If the pre-enqueue area is not full, then an FCB formed upon receipt of another packet is added to the pre-enqueue area (element 304). Then, upon receipt of another packet, the pre-enqueue area is checked again to see if it is full (element 302). If the pre-enqueue area is full of FCBs, then the three FCBs from the pre-enqueue area are joined with a fourth FCB formed upon receipt of another packet (element 306). Then, the newly formed TCB is enqueued into a TCB page queue (element 308) and the process continues (element 302).

Figure 3B:
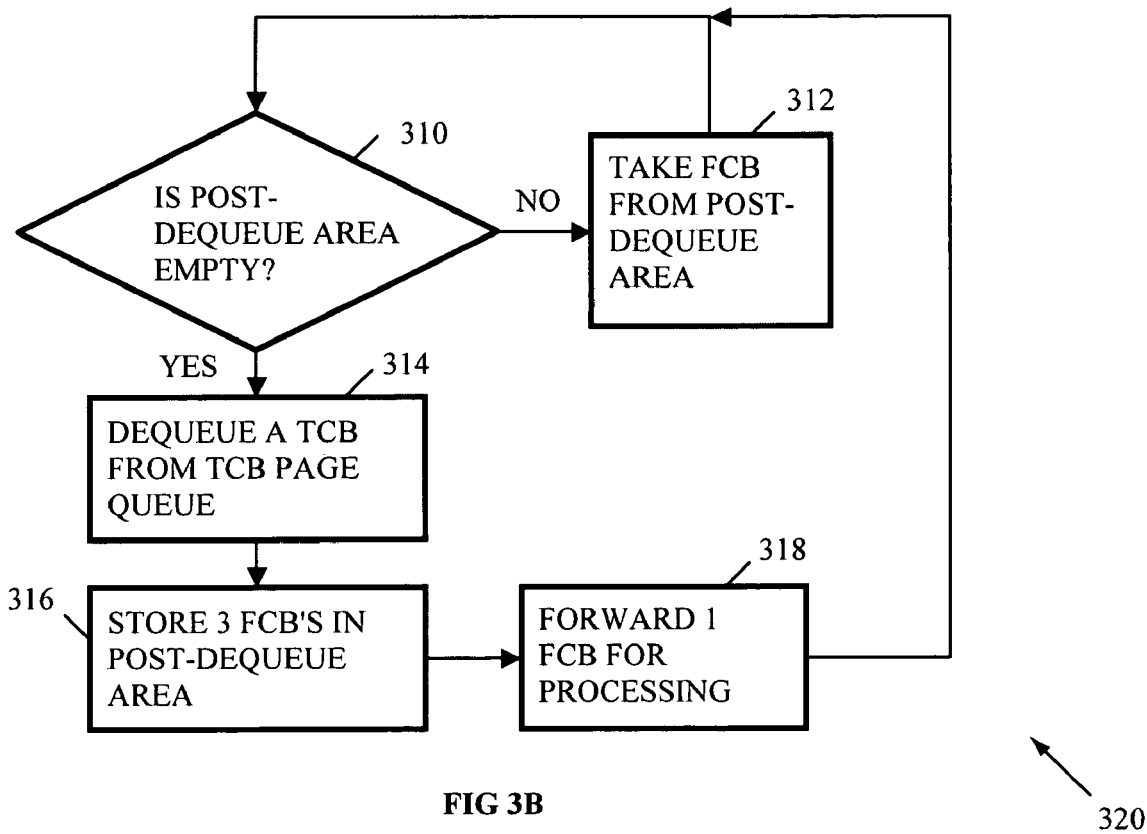
FIG. 3B depicts a flow chart for dequeing frame control blocks in a Table Control Block format.

FIG. 3B shows a flow chart 320 of an embodiment to forward packets from a dequeued TCB using PDA 250. The process FIG. 3B shows is complementary to the process FIG. 3A shows. A determination is made whether the post-dequeue area is empty (element 310). If the post-dequeue area is not empty, then an FCB is taken from the post-dequeue area and forwarded for processing (element 312). More precisely, the FCB is taken from the post-dequeue area and the frame pointer of the FCB is read to retrieve the frame from the data store. After the FCB is removed from the post-dequeue area, the post-dequeue area is again checked to determine if it is empty (element 310). If the post-dequeue area is empty, another TCB is dequeued from a TCB page queue (element 314). The dequeued TCB comprises four FCBs. Three of the four FCBs are stored in the post dequeue area (element 316) and the fourth FCB is forwarded for processing. Then the process continues (element 310).

Thus, embodiments enable a control store to be implemented in DRAM or other cost effective memory even though such memory exhibits a long memory access latency. By organizing frame control blocks into table control blocks, reads and writes to the memory are needed less often and can therefore be completed as often as needed to keep up with the frame rate of data packet transmission.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for storing and retrieving frame control blocks associated with packet data received by a network processor, comprising:

associating a plurality of frames of packet data to form a table control block comprising a plurality of frame control blocks, each frame control block associated with a different packet of data received by the network processor and comprising a pointer to a memory location where a packet of data is stored;

storing table control blocks in a control store, each table control block comprising a pointer to a memory location where a next table control block in a sequence of table control blocks is stored; and retrieving a table control block from memory to process packets of data associated with the frame control blocks of the retrieved table control block.

2. The method of claim 1, further comprising storing table control blocks in a free queue, each frame of a table control block in the free queue being available to be associated with a packet of data received by the network processor.

3. The method of claim 1, further comprising temporarily storing frame control blocks from a de-queued table control block prior to transmission of the packet data associated with the temporarily stored frame control blocks.

4. The method of claim 1, further comprising temporarily storing a packet of data received by the network processor while a frame control block is obtained to be associated with the packet of data.

5. The method of claim 1, further comprising determining if a pre-enqueue memory is full of frame control blocks, and if so, then forming a table control block comprising the frame control blocks in the pre-enqueue memory.

6. The method of claim 1, wherein retrieving a table control block further comprises determining if every frame control block in a post-dequeue memory has been read.

7. The method of claim 1, wherein forming a table control block further comprises temporarily storing frame control blocks in a pre-enqueue memory to obtain enough frame control blocks to fill a table control block.

* * * * *